US011797024B2

(12) United States Patent
Ayers et al.

(10) Patent No.: US 11,797,024 B2
(45) Date of Patent: *Oct. 24, 2023

(54) METHODS AND SYSTEMS FOR CONFIGURING VEHICLE COMMUNICATIONS

(71) Applicant: Uber Technologies, Inc., San Francisco, CA (US)

(72) Inventors: Steve Ayers, Mars, PA (US); Matthew James Way, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/563,479

(22) Filed: Dec. 28, 2021

(65) Prior Publication Data

US 2022/0121219 A1 Apr. 21, 2022

Related U.S. Application Data

(63) Continuation of application No. 16/458,353, filed on Jul. 1, 2019, now Pat. No. 11,237,570.

(Continued)

(51) Int. Cl.
 *G05D 1/00* (2006.01)
 *G05D 1/02* (2020.01)
 (Continued)

(52) U.S. Cl.
 CPC .......... *G05D 1/0276* (2013.01); *G05D 1/0088* (2013.01); *G07C 5/008* (2013.01);
 (Continued)

(58) Field of Classification Search
 CPC .............. G05D 1/0276; G05D 1/0088; G05D 2201/0213; G05D 1/00; G05D 1/02;
 (Continued)

(56) References Cited

U.S. PATENT DOCUMENTS 10,103,938 B1 * 10/2018 Samii ..................... H04W 4/40
11,237,570 B2 2/2022 Ayers et al.
(Continued)

FOREIGN PATENT DOCUMENTS

WO 2020210586 10/2020

OTHER PUBLICATIONS

"International Application Serial No. PCT US2020 027610, International Search Report dated Jul. 28, 2020", 4 pgs.
(Continued)

*Primary Examiner* — Yonel Beaulieu
(74) *Attorney, Agent, or Firm* — SCHWEGMAN LUNDBERG & WOESSNER, P.A.

(57) ABSTRACT

The present disclosure is directed to configuring vehicle communications. In particular, a computing system comprising one or more computing devices physically located onboard a vehicle can communicate a plurality of different and distinct types of information associated with the vehicle to a remotely located computing system via a data stream transmitted from the vehicle to the remotely located computing system. The computing system can determine one or more changes in at least one of a mode, state, or context of the vehicle, and responsive to determining the change(s), the computing system can modify one or more parameters of the data stream transmitted from the vehicle to the remotely located computing system.

20 Claims, 8 Drawing Sheets

Related U.S. Application Data

(60) Provisional application No. 62/833,392, filed on Apr. 12, 2019.

(51) Int. Cl.
*G07C 5/00* (2006.01)
*G07C 5/08* (2006.01)

(52) U.S. Cl.
CPC ........... *G07C 5/085* (2013.01); *G07C 5/0808* (2013.01); *G05D 2201/0213* (2013.01)

(58) Field of Classification Search
CPC ...... G07C 5/008; G07C 5/0808; G07C 5/085; G07C 5/00; G07C 5/08; H04L 67/12
See application file for complete search history.

(56) References Cited

U.S. PATENT DOCUMENTS

| | | |
|---|---|---|
| 2010/0302359 A1 | 12/2010 | Adams et al. |
| 2018/0284770 A1* | 10/2018 | VandenBerg, III .. G08G 1/0133 |
| 2018/0297210 A1* | 10/2018 | Peterson ................ B25J 19/023 |
| 2020/0097841 A1* | 3/2020 | Petousis ............... G07C 5/0808 |
| 2020/0326723 A1 | 10/2020 | Ayers et al. |

OTHER PUBLICATIONS

"International Application Serial No. PCT US2020 027610, Written Opinion dated Jul. 28, 2020", 9 pgs.

"International Application Serial No. PCT US2020 027610, International Preliminary Report on Patentability dated Oct. 21, 2021", 11 pgs.

"U.S. Appl. No. 16/458,353, Non Final Office Action dated May 21, 2021", 25 pgs.

"U.S. Appl. No. 16/458,353, Response filed Aug. 18, 2021 to Non Final Office Action dated May 21, 2021", 10 pgs.

"U.S. Appl. No. 16/458,353, Examiner Interview Summary dated Aug. 20, 2021", 3 pgs.

"U.S. Appl. No. 16/458,353, Notice of Allowance dated Sep. 17, 2021", 9 pgs.

"U.S. Appl. No. 16/458,353, Examiner Interview Summary dated Sep. 28, 2021", 2 pgs.

"U.S. Appl. No. 16/458,353, Corrected Notice of Allowability dated Oct. 4, 2021", 5 pgs.

* cited by examiner

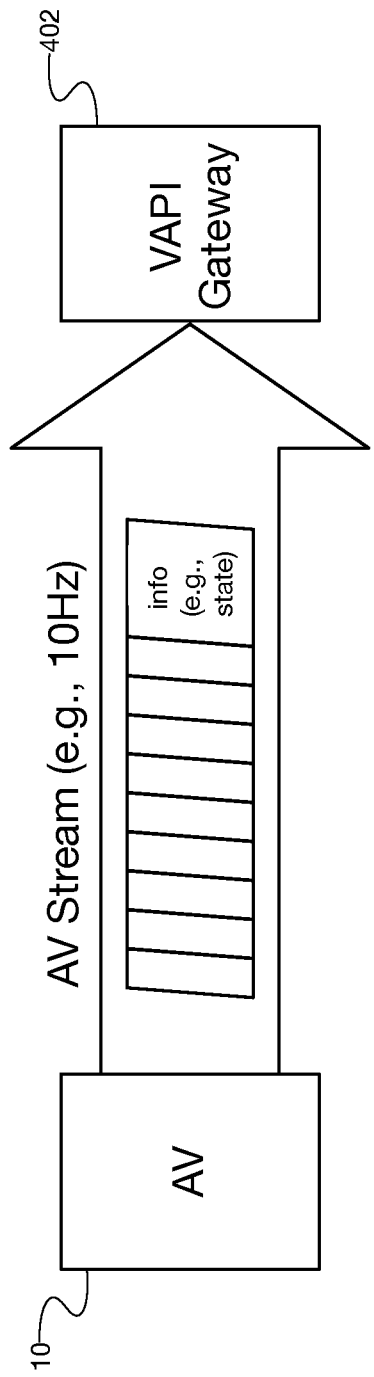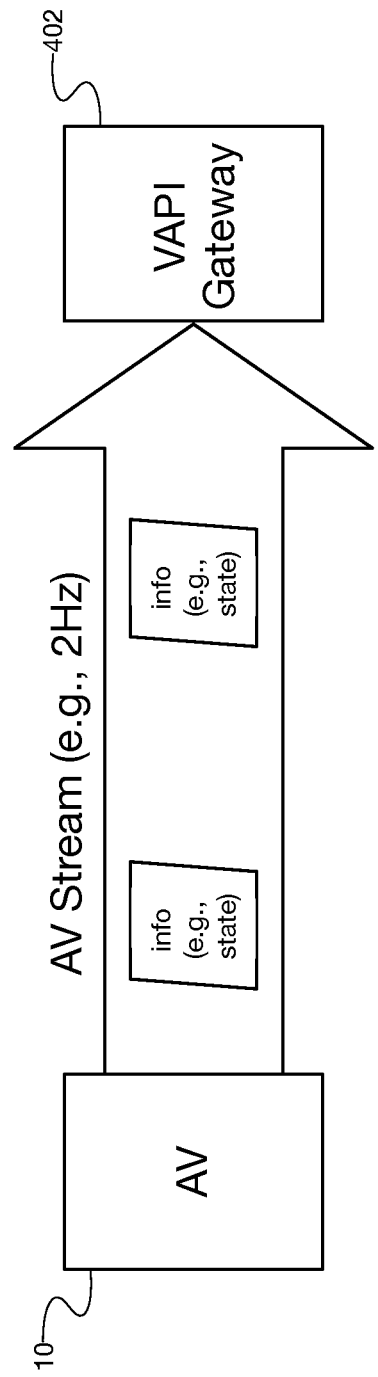
FIG. 4A
FIG. 4B

METHODS AND SYSTEMS FOR CONFIGURING VEHICLE COMMUNICATIONS

PRIORITY CLAIM

This application is a continuation of U.S. patent application Ser. No. 16/458,353 (now issued as U.S. Pat. No. 11,237,570) which claims the benefit of priority of U.S. Application Ser. No. 62/909,019, filed Oct. 1, 2019, which is hereby incorporated by reference in its entirety.

FIELD

The present disclosure relates generally to vehicles. More particularly, the present disclosure relates to configuring vehicle communications.

BACKGROUND

A vehicle can be used to provide transportation in one or more different contexts. An autonomous vehicle is a vehicle that is capable of sensing its environment and navigating with minimal or no human input. In particular, an autonomous vehicle can observe its surrounding environment using a variety of sensors and identify an appropriate path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include communicating, by a computing system comprising one or more computing devices physically located onboard a vehicle, to a remotely located computing system, and via a data stream transmitted from the vehicle to the remotely located computing system, a plurality of different and distinct types of information associated with the vehicle. The method can also include determining, by the computing system, one or more changes in at least one of a mode, state, or context of the vehicle. The method can further include, responsive to determining the change(s), modifying, by the computing system, one or more parameters of the data stream transmitted from the vehicle to the remotely located computing system.

Another example aspect of the present disclosure is directed to a vehicle. The vehicle can include one or more wireless-communication interfaces and one or more computing devices comprising one or more processors and a memory storing instructions that when executed by the processor(s) cause the computing device(s) to perform operations. The operations can include communicating, via the wireless-communication interface(s), to a remotely located computing system, and at a first rate, a particular type of information associated with the vehicle. The operations can also include, responsive to determining one or more changes in at least one of a mode, state, or context of the vehicle, communicating, via the wireless-communication interface(s), to the remotely located computing system, and at a second rate, the particular type of information. The second rate can be different from the first rate.

A further example aspect of the present disclosure is directed to one or more non-transitory computer-readable media comprising instructions that when executed by one or more computing devices physically located onboard a vehicle cause the computing device(s) to perform operations. The operations can include communicating, to a remotely located computing system, a plurality of different and distinct types of information associated with the vehicle. The operations can also include determining one or more changes in at least one of a mode, state, or context of the vehicle. The operations can further include, responsive to determining the change(s), determining one or more changes to at least one of: the plurality of different and distinct types of information to be communicated to the remotely located computing system, or one or more rates at which one or more of the plurality of different and distinct types of information are to be communicated to the remotely located computing system.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which:

FIGS. 4A and 4B depict example data streams according to example embodiments of the present disclosure;

DETAILED DESCRIPTION

Figure 1:
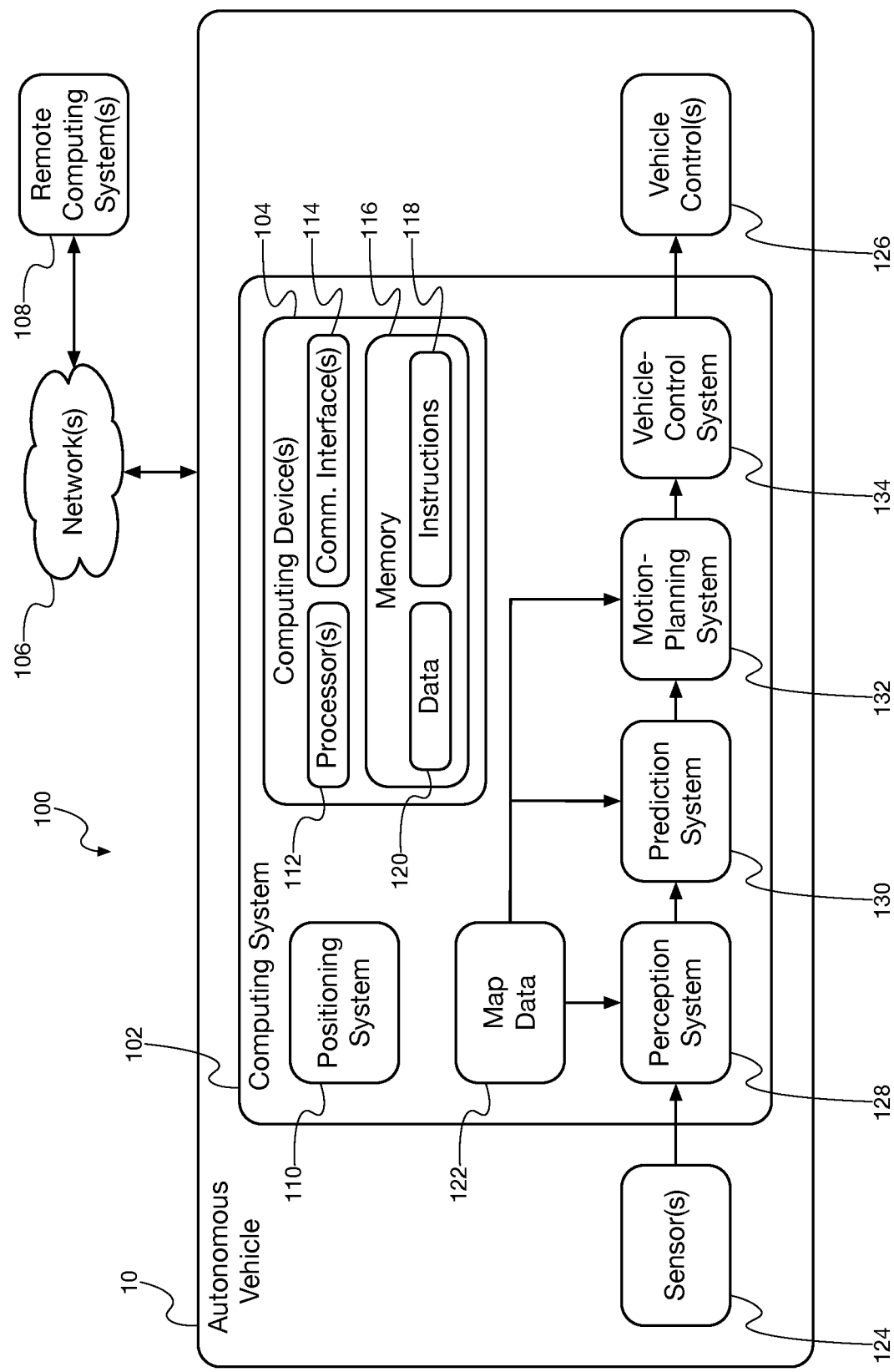
FIG. 1 depicts an example autonomous vehicle according to example embodiments of the present disclosure.

Example aspects of the present disclosure are directed to configuring vehicle communications. In particular, one or more computing devices physically located onboard a vehicle (e.g., an autonomous vehicle, a human-operated vehicle, remotely controlled vehicle, ground-based vehicle, air-based vehicle (e.g., vertical take-off and landing (VTOL) vehicle, and/or the like), water-based vehicle, and/or the like) can communicate multiple different and distinct types of information (e.g., telemetry, travel data, diagnostic information, navigation information, telecommunications information, infotainment information, and/or the like) to a remotely located computing system (e.g., server, vehicle-management platform, and/or the like). For example, such information can be communicated as part of a data stream (e.g., from the onboard computing device(s) to the remotely located computing system, and/or the like).

Over time the mode, state, context, and/or the like of the vehicle can change (e.g., specified travel can be completed, new travel can commence, one or more diagnostic routines can be initiated, the surrounding environment, traffic, weather conditions, and/or the like can change, and/or the like), and the onboard computing device(s) can determine, detect, identify, and/or the like such changes. For example, the onboard computing device(s) can determine, detect, identify, and/or the like whether the vehicle is in a test mode, whether the vehicle is in a diagnostic mode, whether the vehicle is in a remote-assistance mode, whether the vehicle is in an environment-mapping mode, whether the vehicle is engaged in commissioned travel, a type of commissioned travel with which the vehicle is engaged, and/or the like.

In accordance with aspects of the disclosure, responsive to detecting one or more of such changes, the onboard computing device(s) can modify one or more parameters of a data stream transmitted from the vehicle that includes the multiple different and distinct types of information (e.g., a data stream previously transmitted, being transmitted, to be transmitted, and/or the like). For example, the onboard computing device(s) can include logic that enforces one or more rules, and/or the like with respect to the construction, operation, functioning, and/or the like of the data stream responsive to, based at least in part on, and/or the like detecting, determining, and/or the like such change(s) in the mode, state, context, and/or the like of the vehicle.

In some embodiments, the multiple different and distinct types of information can be communicated by the onboard computing devices to the remotely located computing system (e.g., via the data stream, and/or the like) at various rates (e.g., frequencies, hertz, and/or the like). In some of such embodiments, modifying the parameter(s) can include changing one or more of such rate(s).

Additionally or alternatively, modifying the parameter(s) can include changing the types of information included amongst the different and distinct types of information communicated. For example, the parameter(s) could be modified to change whether or not the different and distinct types of information (e.g., the data stream, and/or the like) include data indicating whether the vehicle is engaged in commissioned travel, a type of commissioned travel with which the vehicle is engaged, a pickup location associated with commissioned travel with which the vehicle is engaged, a drop-off location associated with commissioned travel with which the vehicle is engaged, passenger information associated with commissioned travel with which the vehicle is engaged, a version of software being executed by the vehicle, diagnostic information associated with the vehicle, a speed of the vehicle, a location of the vehicle, a route which the vehicle is following, and/or the like.

In some embodiments, the onboard computing device(s) can receive data (e.g., configuration information, instructions, and/or the like) indicating one or more portions of the different and distinct types of information (e.g., associated with a requested configuration change, and/or the like) from a remotely located computing device (e.g., associated with a technician, diagnostic system, remote-assistance system, and/or the like). For example, the onboard computing device(s) can receive data from a remotely located computing device associated with a remote-assistance system indicating that information pertinent to providing remote assistance (e.g., a live video stream, and/or the like) should be included, that information less pertinent to providing the remote assistance (e.g., one or more unrelated diagnostic logs, and/or the like) should not be communicated or should be communicated with less frequency, and/or the like. In some embodiments, such communication can be via an application programming interface (API) provided by the remotely located computing device, the onboard computing device(s), and/or the like (e.g., such an API can serve to effectuate a central configuration service used to provide dynamic configuration changes to one or more vehicles, and/or the like). In some of such embodiments, the onboard computing device(s) can modify the parameter(s) based at least in part on such received data.

In some embodiments, the vehicle and the remotely located computing system can be associated with a common entity, for example, an entity that operates the vehicle, as well as one or more different and distinct vehicles associated with the vehicle (e.g., a fleet of vehicles, and/or the like). In some of such embodiments, communicating the different and distinct types of information can comprise communicating, via one or more networks (e.g., wireless networks, wired networks, and/or the like), the data stream directly from the vehicle to the remotely located computing system.

Additionally or alternatively, the vehicle can be associated with an entity (e.g., a third-party vehicle provider, entity that provides vehicle services, and/or the like) different and distinct from the entity with which the remotely located computing system is associated. In some of such embodiments, communicating the different and distinct types of information can comprise communicating, via one or more networks (e.g., wireless networks, wired networks, and/or the like), the data stream directly from the vehicle to the remotely located computing system. For example, such communication can be via an API provided by the remotely located computing system, the onboard computing device(s), and/or the like.

Additionally or alternatively, the vehicle can be associated with a different and distinct remotely located computing system (e.g., associated with the third-party vehicle provider, entity that provides vehicle services, and/or the like), and communicating the different and distinct types of information can comprise: communicating, via one or more networks (e.g., wireless networks, wired networks, and/or the like), the data stream directly from the vehicle to such different and distinct remotely located computing system; and receiving, by the remotely located computing system and from such different and distinct remotely located computing system, the plurality of different and distinct types of information. For example, such communication can be via an API provided by the remotely located computing system, the different and distinct remotely located computing system, the onboard computing device(s), and/or the like.

In some embodiments, the onboard computing device(s) can communicate the different and distinct types of information via a software development kit (SDK) provided to the onboard computing device(s) by the remotely located computing system. For example, such an SDK can include one or more routines, libraries, logic, and/or the like that can be utilized (e.g., by an entity associated with the vehicle, and/or the like) to communicate the different and distinct types of information, and/or the like.

Various means can be configured to perform the methods and processes described herein. For example, a computing system can include change-determination unit(s), parameter-determination unit(s), data-communication unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/ other memory device(s), data registrar(s), database(s), and/ or other suitable hardware.

The means can be programmed to perform one or more algorithm(s) for carrying out the operations and functions described herein. For instance, the means can be configured to communicate the different and distinct types of information associated with the vehicle, determine the change(s) in the mode, state, context, and/or the like of the vehicle, modify the parameter(s) of the data stream, and/or the like.

The technology described herein can provide a number of technical effects and benefits. For example, the technology described herein can modify the parameter(s) of the data stream responsive to determining the change(s) to the mode, state, context, and/or the like of the vehicle. Such modification(s) can optimize communication usage relative to the current operating mode, state, context, and/or the like of the vehicle. For example, given certain modes, states, contexts, and/or the like, it may be advantageous to include or send at a greater frequency particular types of information associated with the vehicle, while in other modes, states, contexts, and/or the like, such information may be of less value and resources may be conserved or more optimally allocated to other uses by omitting such information or communicating it less frequently, and/or the like. The technology described herein can provide a means by which the inclusion or communication frequency of certain types of information can be dynamically configured, modified, and/or the like responsive to, based at least in part on, and/or the like detecting, determining, and/or the like one or more changes in the mode, state, context, and/or the like of the vehicle, ensuring that available resources can be allocated to the information types most relevant to the current mode, state, context, and/or the like of the vehicle. Accordingly, the technology described here can dynamically adjust the configuration of the data stream, and/or the like in a manner that reduces resource consumption, optimizes resource utilization, improves performance, and/or the like.

While the present disclosure is described through with reference to vehicles, this description is provided by way of example and not intended to be limiting. For example, the technology described herein can be utilized with robotic systems and/or other types of computing systems (mobile or stationary).

With reference now to the figures, example embodiments of the present disclosure will be discussed in further detail.

FIG. 1 depicts an example autonomous vehicle according to example embodiments of the present disclosure.

Referring to FIG. 1, environment 100 can include autonomous vehicle 10, one or more networks 106, and one or more remotely located computing systems 108.

Autonomous vehicle 10 can be capable of sensing its environment, navigating its environment with minimal or no human input, and/or the like. Autonomous vehicle 10 can be a ground-based autonomous vehicle (e.g., car, truck, bus, and/or the like), an air-based autonomous vehicle (e.g., airplane, drone, helicopter, bike, scooter, light electric vehicle, and/or the like), and/or other type of vehicle (e.g., watercraft, and/or the like). Autonomous vehicle 10 can include one or more sensors 124, computing system 102, and one or more vehicle controls 126. Computing system 102 can assist in controlling autonomous vehicle 10. For example, computing system 102 can receive data generated by sensor(s) 124, attempt to comprehend an environment surrounding autonomous vehicle 10 by performing various processing techniques on the data generated by sensor(s) 124, generate, determine, select, and/or the like a motion plan for navigating autonomous vehicle 10 through, within, and/or the like such surrounding environment, and/or the like. Computing system 102 can interface with vehicle control(s) 126 to operate autonomous vehicle 10 (e.g., in accordance with the motion plan, and/or the like).

Computing system 102 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable autonomous vehicle 10 (e.g., computing system 102, computing device(s) 104, and/or the like) to communicate with one or more computing systems, computing devices, and/or the like distinct from autonomous vehicle 10 (e.g., computing system(s) 108, and/or the like). Memory 116 can include (e.g., store, and/or the like) instructions 118 and data 120. When executed by processor(s) 112, instructions 118 can cause autonomous vehicle 10 (e.g., computing system 102, computing device(s) 104, and/or the like) to perform one or more operations, functions, and/or the like described herein. Data 120 can include, represent, and/or the like information associated with such operations, functions, and/ or the like, data generated by sensor(s) 124, and/or the like.

Computing system 102 can be physically located onboard autonomous vehicle 10, and computing system(s) 108 can be distinct and/or remotely located from autonomous vehicle 10. Network(s) 106 (e.g., wired networks, wireless networks, and/or the like) can interface autonomous vehicle 10 (e.g., computing system 102, computing device(s) 104, and/or the like) with computing system(s) 108, which can include one or more computing devices analogous to computing device(s) 104, one or more components (e.g., memory, processors, communication interfaces, and/or the like) analogous to those of computing device(s) 104, and/or the like. Irrespective of attribution described or implied herein, unless explicitly indicated otherwise, the operations, functions, and/or the like described herein can be performed by computing system(s) 102 and/or 108 (e.g., by computing system 102, by computing system(s) 108, by a combination of computing system(s) 102 and 108, and/or the like).

Computing system 102 can include positioning system 110, which can include one or more devices, circuitry, and/or the like for analyzing, approximating, determining, and/or the like one or more geographic positions of autonomous vehicle 10. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 102 can include perception system 128, prediction system 130, and motion-planning system 132, which can cooperate to perceive a dynamic environment surrounding autonomous vehicle 10, generate, determine, select, and/or the like a motion plan for autonomous vehicle 10, and/or the like.

Perception system 128 can receive data from sensor(s) 124, which can be coupled to or otherwise included within autonomous vehicle 10. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding autonomous vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding autonomous vehicle 10. For example, map data 122 can provide information regarding: the identity and location of different travelways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic-control data (e.g., the location and/or instructions of signage, traffic lights, other traffic-control devices, and/or the like); other map data providing information that can assist computing system 102 in comprehending, perceiving, and/or the like an environment surrounding autonomous vehicle 10, its relationship thereto, and/or the like.

Perception system 128 can (e.g., based at least in part on data received from sensor(s) 124, map data 122, and/or the like) identify one or more objects proximate to autonomous vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, bicycle, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object. Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion-planning system 132 can generate, determine, select, and/or the like a motion plan for autonomous vehicle 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion-planning system 132 can generate, determine, select, and/or the like a motion plan for autonomous vehicle 10 that it determines (e.g., based at least in part on one or more operation parameters, and/or the like) best navigates autonomous vehicle 10 relative to the object(s). Motion-planning system 132 can provide the motion plan to vehicle-control system 134, which can directly and/or indirectly control autonomous vehicle 10 via vehicle control(s) 126 (e.g., one or more actuators, devices, and/or the like that control gas, power flow, steering, braking, and/or the like) in accordance with the motion plan.

Perception system 128, prediction system 130, motion-planning system 132, and/or vehicle-control system 134 can include logic utilized to provide functionality described herein. Perception system 128, prediction system 130, motion-planning system 132, and/or vehicle-control system 134 can be implemented in hardware (e.g., circuitry, and/or the like), firmware, software configured to control one or more processors, one or more combinations thereof, and/or the like. For example, instructions 118, when executed by processor(s) 112, can cause autonomous vehicle 10 (e.g., computing system 102, computing device(s) 104, and/or the like) to implement functionality of perception system 128, prediction system 130, motion-planning system 132, and/or vehicle-control system 134 described herein.

Figure 2:
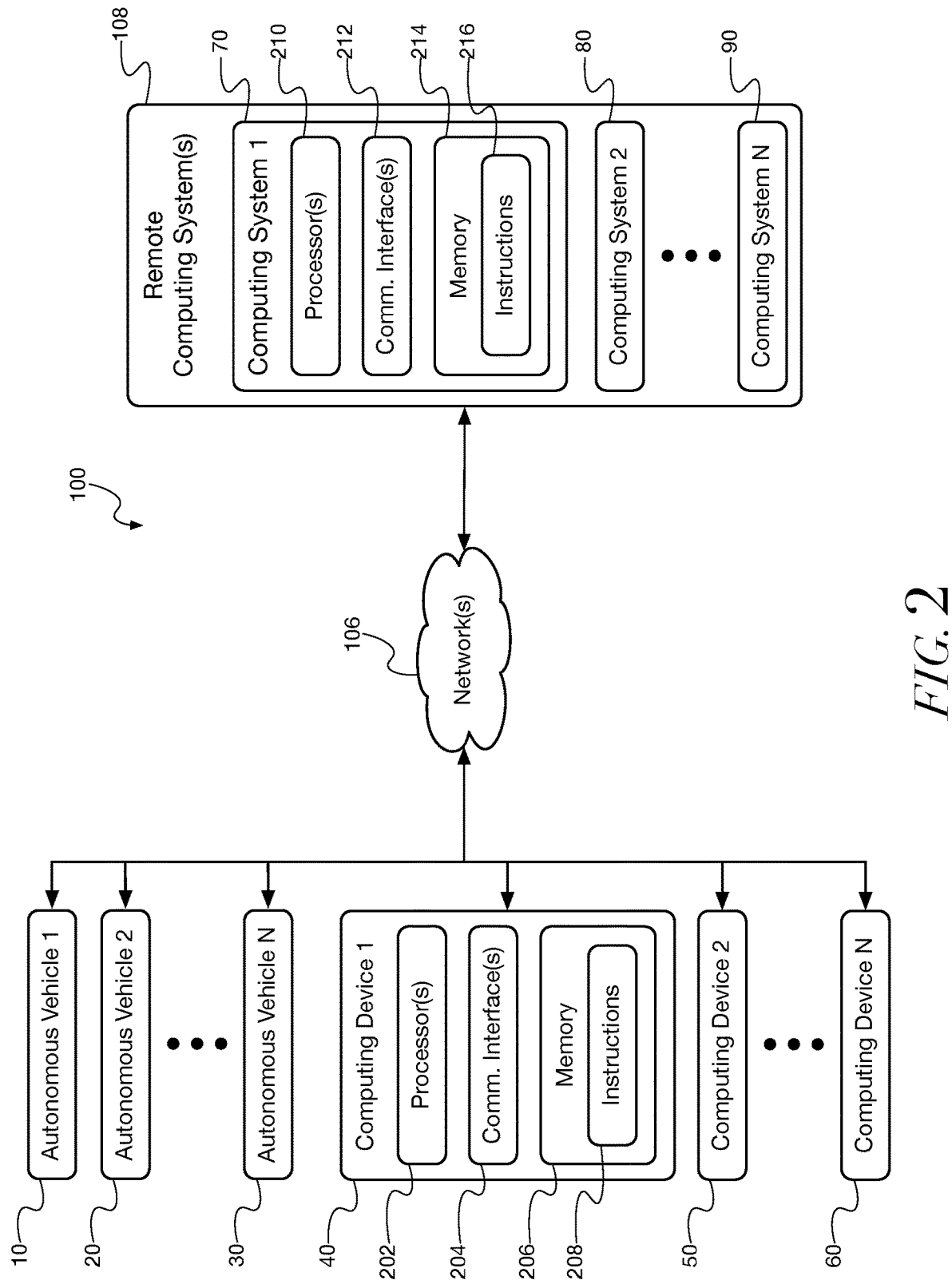
FIG. 2 depicts an example computing environment according to example embodiments of the present disclosure.

FIG. 2 depicts an example computing environment according to example embodiments of the present disclosure.

Referring to FIG. 2, as previously indicated, environment 100 can include autonomous vehicle 10, network(s) 106, and computing system(s) 108. Environment 100 can also include autonomous vehicle(s) 20 and/or 30, and/or computing device(s) 40, 50, and/or 60.

Autonomous vehicle(s) 20 and/or 30 can include one or more components analogous to those described above with respect to autonomous vehicle 10, and/or the like.

Computing device 40 can include circuitry configured to perform one or more operations, functions, and/or the like described herein. For example, computing device 40 can include one or more processor(s) 202, one or more communication interfaces 204, and memory 206 (e.g., one or more hardware components for storing executable instructions, data, and/or the like). Communication interface(s) 204 can enable computing device 40 to communicate with autonomous vehicle 10 (e.g., computing system 102, computing device(s) 104, and/or the like), autonomous vehicle(s) 20 and/or 30, computing device(s) 50, and/or 60, computing system(s) 108, and/or the like. Memory 206 can include (e.g., store, and/or the like) instructions 208, which, when executed by processor(s) 202, can cause computing device 40 to perform one or more operations, functions, and/or the like described herein.

Computing device(s) 50 and/or 60 can include one or more components analogous to those described above with respect to computing device 40, and/or the like.

Computing system(s) 108 can include one or more computing systems, such as, for example, computing system(s) 70, 80, and/or 90.

Computing system 70 can include one or more computing devices, which can include circuitry configured to perform one or more operations, functions, and/or the like described herein. For example, computing system 70 can include one or more processor(s) 210, one or more communication interfaces 212, and memory 214 (e.g., one or more hardware components for storing executable instructions, data, and/or the like). Communication interface(s) 212 can enable computing system 70 to communicate with autonomous vehicle 10 (e.g., computing system 102, computing device(s) 104, and/or the like), autonomous vehicle(s) 20 and/or 30, computing device(s) 40, 50, and/or 60, computing system(s) 80 and/or 90, and/or the like. Memory 214 can include (e.g., store, and/or the like) instructions 216, which, when executed by processor(s) 210, can cause computing system 70 (e.g., one or more computing devices included therein, and/or the like) to perform one or more operations, functions, and/or the like described herein.

Computing system(s) 80 and/or 90 can include one or more components analogous to those described above with respect to computing system 70, and/or the like.

It will be appreciated that irrespective of attribution described or implied herein, unless explicitly indicated otherwise, the operations, functions, and/or the like described herein can be performed by autonomous vehicle(s) 10 (e.g., computing system 102, computing device(s) 104, and/or the like), 20, and/or 30, computing device(s) 40, 50, and/or 60, and/or computing system(s) 108 (e.g., by autonomous vehicle(s) 10, 20, and/or 30, by computing device(s) 40, 50, and/or 60, by computing system(s) 70, 80, and/or 90, by a combination of autonomous vehicle(s) 10, 20, and/or 30, computing device(s) 40, 50, and/or 60, computing system(s) 70, 80, and/or 90, and/or the like).

Figure 3A:
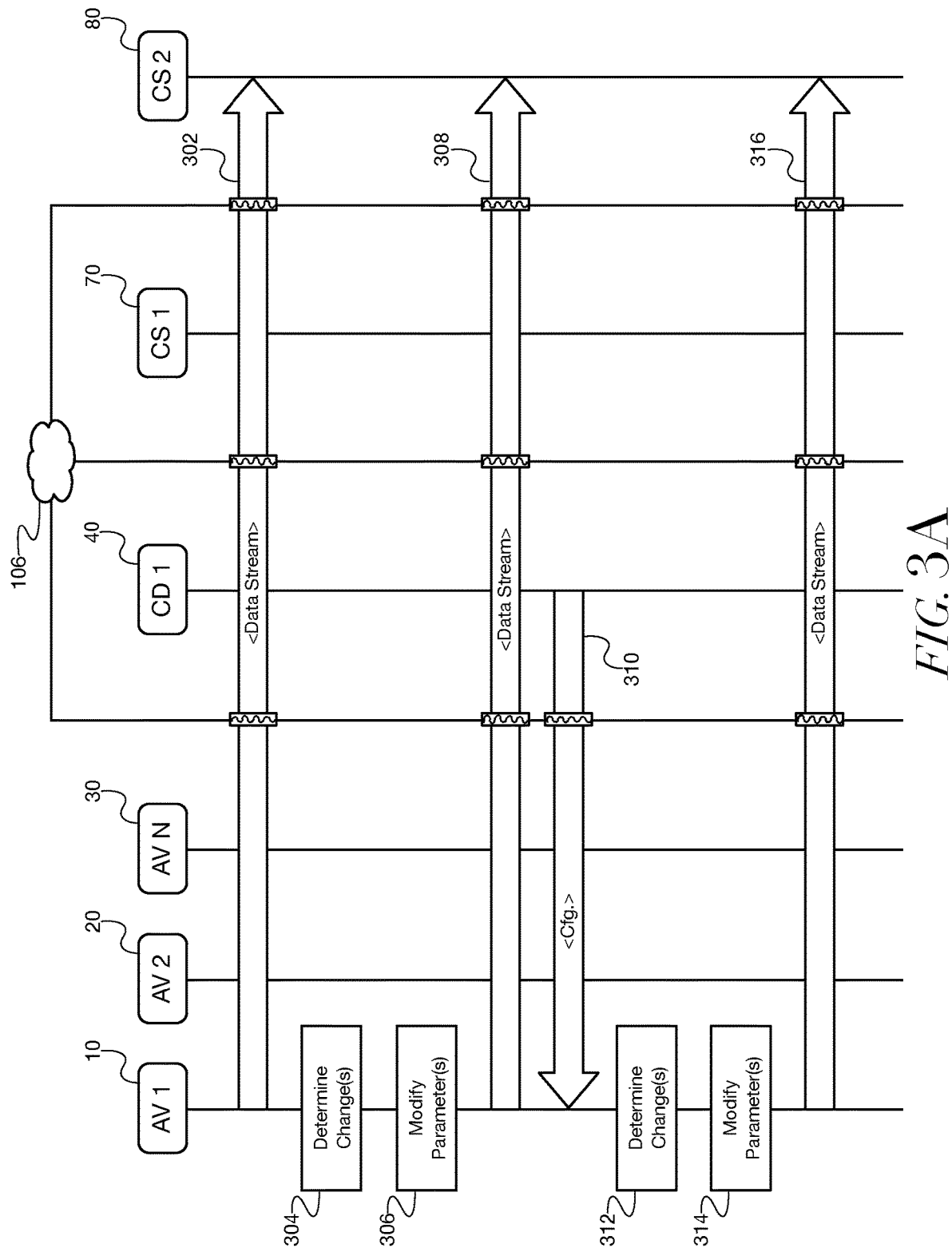
FIGS. 3A-C depict an example event sequence according to example embodiments of the present disclosure.
Figure 3B:
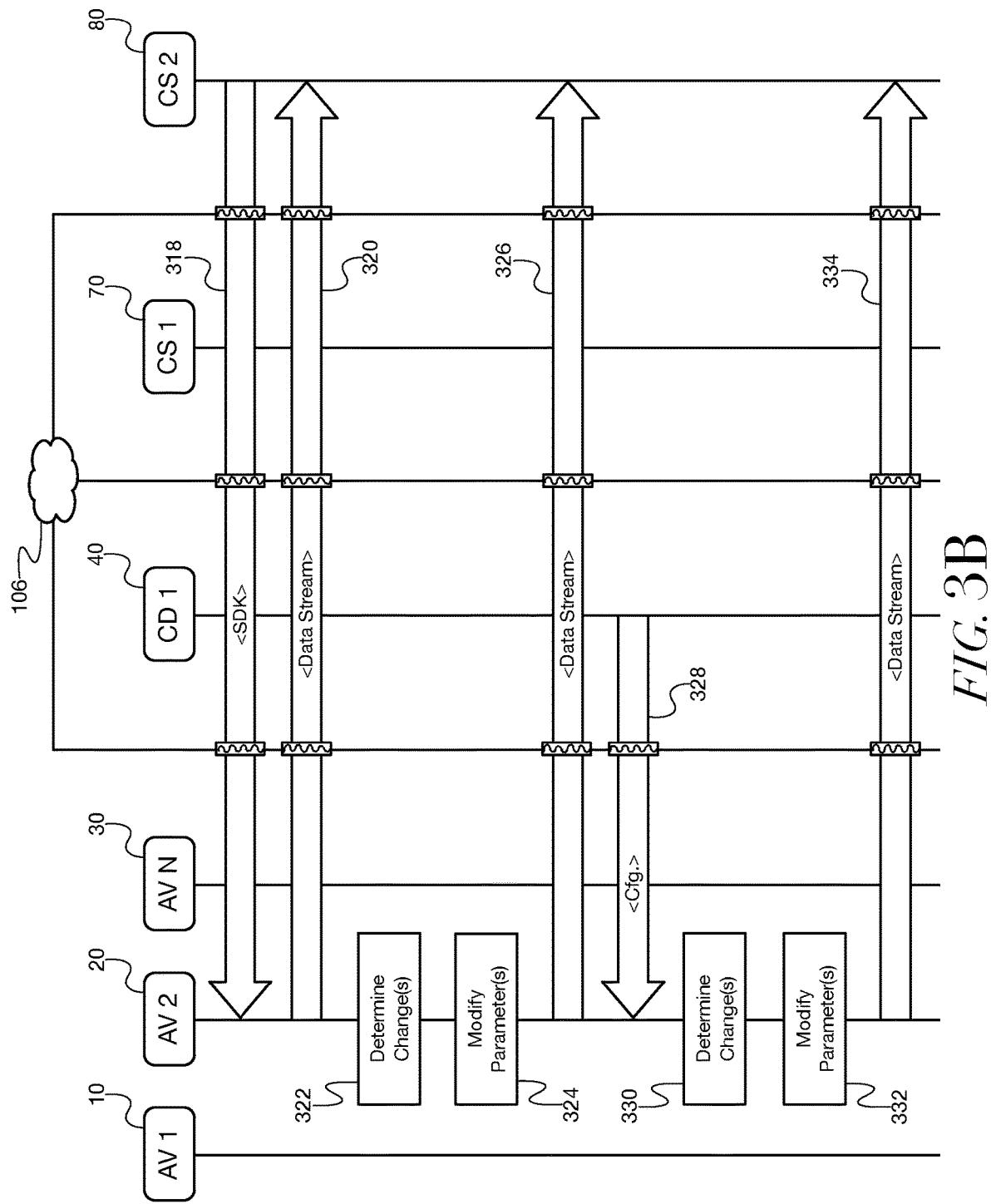
Figure 3C:
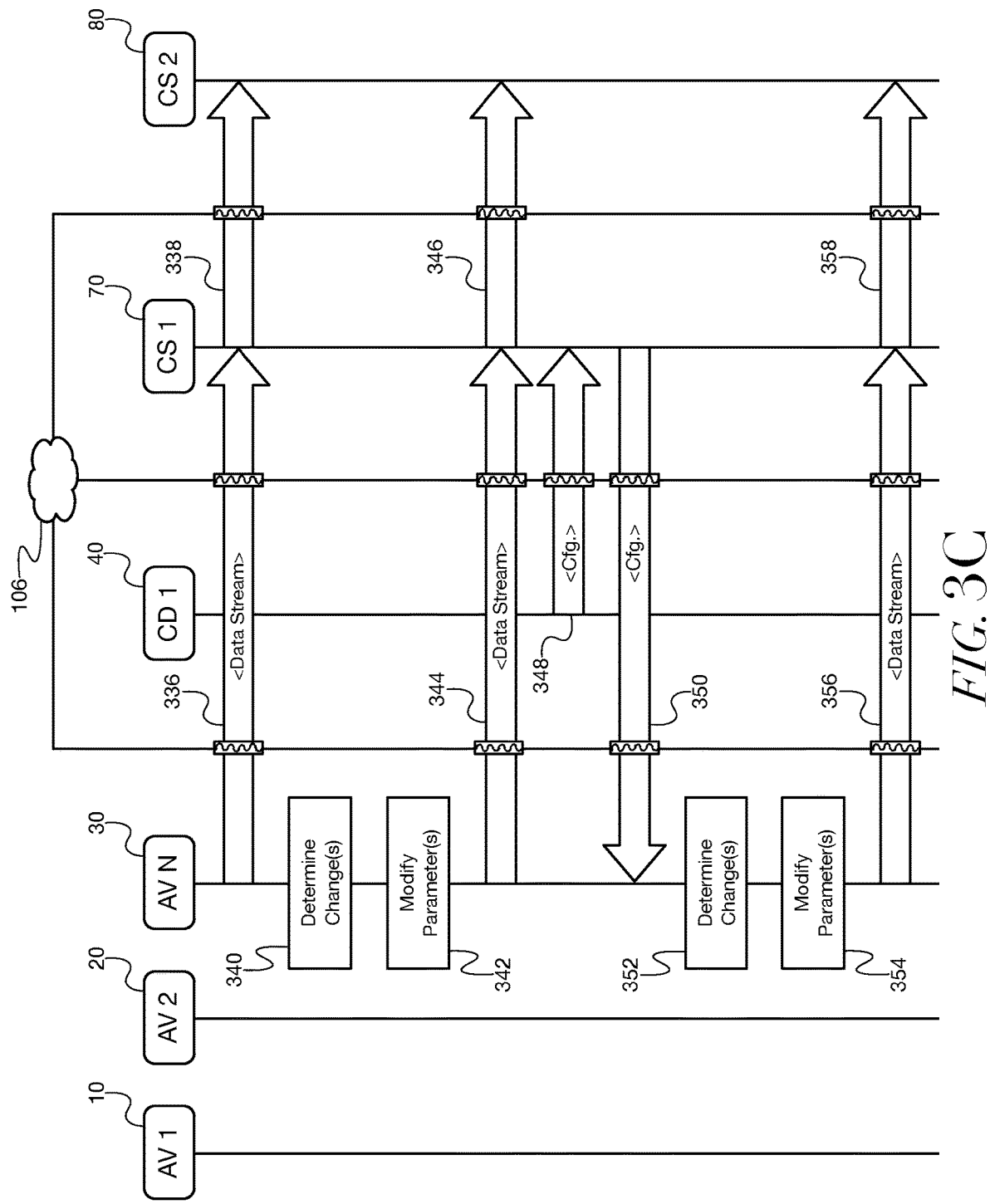

FIGS. 3A-C depict an example event sequence according to example embodiments of the present disclosure.

Referring to FIG. 3A, at (302), autonomous vehicle 10 (e.g., computing system 102, computing device(s) 104, and/or the like) can communicate (e.g., via network(s) 106, as indicated by the pattern-filled boxes over the lines extending downward from network(s) 106, and/or the like) data indicating multiple different and distinct types of information (e.g., telemetry, travel data, diagnostic information, and/or the like) to computing system 80, which can receive the data. For example, computing system 80 can be associated with an entity that operates a plurality of associated autonomous vehicles (e.g., a fleet of autonomous vehicles, and/or the like) that includes autonomous vehicle 10, and computing system 102 can be configured to communicate (e.g., transmit, and/or the like) a data stream comprising the data indicating the multiple different and distinct types of information to computing system 80 (e.g., directly via communication interface(s) 114, network(s) 106, and/or the like). In some embodiments, computing system 80 can be remotely located from autonomous vehicle 10 (e.g., a server, one or more computing devices physically located onboard a different vehicle, and/or the like).

At (304), computing system 102 can determine, detect, identify, and/or the like one or more changes in a mode, state, context, and/or the like of autonomous vehicle 10. For example, over time the mode, state, context, and/or the like of autonomous vehicle 10 can change (e.g., specified travel can be completed, new travel can commence, one or more diagnostic routines can be initiated, and/or the like), and computing system 102 can determine, detect, identify, and/or the like such changes. For example, computing system 102 can determine, detect, identify, and/or the like whether autonomous vehicle 10 is in a test mode, whether autonomous vehicle 10 is in a diagnostic mode, whether autonomous vehicle 10 is in a remote-assistance mode, whether autonomous vehicle 10 is in an environment-mapping mode, whether autonomous vehicle 10 is engaged in commissioned travel, a type of commissioned travel with which autonomous vehicle 10 is engaged, and/or the like.

At (306), responsive to detecting the change(s), computing system 102 can modify one or more parameters of a data stream transmitted from autonomous vehicle 10 that includes the multiple different and distinct types of information (e.g., associated with the communication at (304), and/or the like). For example, computing system 102 can include logic that enforces one or more rules, and/or the like with respect to the construction, operation, functioning, and/or the like of the data stream responsive to, based at least in part on, and/or the like detecting, determining, and/or the like such change(s) in the mode, state, context, and/or the like of autonomous vehicle 10.

At (308), computing system 102 can communicate the data indicating the multiple different and distinct types of information (e.g., via the modified data stream, and/or the like) to computing system 80, which can receive the data.

In some embodiments, the multiple different and distinct types of information can be communicated by computing system 102 to computing system 80 (e.g., via the data stream, and/or the like) at various rates (e.g., frequencies, hertz, and/or the like). In some of such embodiments, modifying the parameter(s) can include changing one or more of such rate(s).

For example, FIGS. 4A and 4B depict example data streams according to example embodiments of the present disclosure.

Referring to FIG. 4A, a particular one of the multiple different and distinct types of information (e.g., associated with a state of autonomous vehicle 10, and/or the like) can be transmitted (e.g., prior to modifying the parameter(s) of the data stream, and/or the like) at a given frequency (e.g., 10 Hz) to vehicle application programming interface (API) 402 (e.g., associated with computing system 80, and/or the like).

Referring to FIG. 4B, the particular one of the multiple different and distinct types of information (e.g., associated with the state of autonomous vehicle 10, and/or the like) can be transmitted (e.g., subsequent to modifying the parameter(s) of the data stream, and/or the like) at a different frequency (e.g., 2 Hz) to vehicle API 402 (e.g., associated with computing system 80, and/or the like).

Additionally or alternatively, modifying the parameter(s) can include changing the types of information included amongst the different and distinct types of information communicated. For example, the parameter(s) could be modified to change whether or not the different and distinct types of information (e.g., the data stream, and/or the like) include data indicating whether autonomous vehicle 10 is engaged in commissioned travel, a type of commissioned travel with which autonomous vehicle 10 is engaged, a pickup location associated with commissioned travel with which autonomous vehicle 10 is engaged, a drop-off location associated with commissioned travel with which autonomous vehicle 10 is engaged, passenger information associated with commissioned travel with which autonomous vehicle 10 is engaged, a version of software being executed by autonomous vehicle 10, diagnostic information associated with autonomous vehicle 10, a speed of autonomous vehicle 10, a location of autonomous vehicle 10, a route which autonomous vehicle 10 is following, and/or the like.

Returning to FIG. 3A, at (310), computing system 102 can receive data (e.g., configuration information, instructions, and/or the like) indicating one or more portions of the different and distinct types of information (e.g., associated with a requested configuration change, and/or the like) from computing device 40 (e.g., a remotely located computing device associated with a technician, diagnostic system, remote-assistance system, and/or the like). For example, computing system 102 can receive data from computing device 40 indicating that information pertinent to providing remote assistance (e.g., a live video stream, and/or the like) should be included, that information less pertinent to providing the remote assistance (e.g., one or more unrelated diagnostic logs, and/or the like) should not be communicated or should be communicated with less frequency, and/or the like. In some embodiments, such communication can be via an API provided by computing device 40, computing system 102, and/or the like (e.g., such an API can serve to effectuate a central configuration service used to provide dynamic configuration changes to autonomous vehicle 10, and/or the like).

In some of such embodiments, computing system 102 can modify the parameter(s) based at least in part on such received data. For example, at (312), computing system 102 can determine, detect, identify, and/or the like one or more changes in a mode, state, context, and/or the like of autonomous vehicle 10 (e.g., based at least in part on the data received at (310), and/or the like), and, at (314), responsive to detecting the change(s), computing system 102 can modify one or more parameters of a data stream transmitted from autonomous vehicle 10 (e.g., associated with the communication at (304), (308), and/or the like).

At (316), computing system 102 can communicate the data indicating the multiple different and distinct types of information (e.g., via the modified data stream, and/or the like) to computing system 80, which can receive the data.

Referring to FIG. 3B, at (318), computing system 80 can communicate data comprising a software development kit (SDK) to autonomous vehicle 20, which can receive the data. Such an SDK can include, for example, one or more routines, libraries, logic, and/or the like that can be utilized (e.g., by an entity associated with autonomous vehicle 20, and/or the like) to communicate different and distinct types of information associated with autonomous vehicle 20 (e.g., telemetry, travel data, diagnostic information, and/or the like) to computing system 80, and/or the like. For example, autonomous vehicle 20 can be associated with an entity that operates a plurality of associated autonomous vehicles (e.g., a fleet of autonomous vehicles, and/or the like) different and distinct from the plurality of autonomous vehicles that includes autonomous vehicle 10 and is associated with the different and distinct entity with which computing system 80 is associated, and the SDK can be utilized by autonomous vehicle 20 to communicate the different and distinct types of information associated with autonomous vehicle 20 to computing system 80.

At (320), autonomous vehicle 20 can communicate data indicating multiple different and distinct types of information (e.g., telemetry, travel data, diagnostic information, and/or the like) to computing system 80, which can receive the data. For example, autonomous vehicle 20 can be configured to communicate (e.g., via the SDK, and/or the like) a data stream comprising the data indicating the multiple different and distinct types of information to computing system 80 (e.g., directly via one or more wireless-communication interfaces, network(s) 106, and/or the like). In some embodiments, such communication can be via an API provided by autonomous vehicle 20 (e.g., via the SDK, and/or the like), computing system 80, and/or the like.

At (322), autonomous vehicle 20 can determine, detect, identify, and/or the like one or more changes in a mode, state, context, and/or the like of autonomous vehicle 20. For example, over time the mode, state, context, and/or the like of autonomous vehicle 20 can change (e.g., specified travel can be completed, new travel can commence, one or more diagnostic routines can be initiated, and/or the like), and autonomous vehicle 20 can determine, detect, identify, and/or the like such changes. For example, autonomous vehicle 20 can determine, detect, identify, and/or the like whether autonomous vehicle 20 is in a test mode, whether autonomous vehicle 20 is in a diagnostic mode, whether autonomous vehicle 20 is in a remote-assistance mode, whether autonomous vehicle 20 is in an environment-mapping mode, whether autonomous vehicle 20 is engaged in commissioned travel, a type of commissioned travel with which autonomous vehicle 20 is engaged, and/or the like.

At (324), responsive to detecting the change(s), autonomous vehicle 20 can modify one or more parameters of a data stream transmitted from autonomous vehicle 20 that includes the multiple different and distinct types of information (e.g., associated with the communication at (320), and/or the like). For example, autonomous vehicle 20 (e.g., the SDK, and/or the like) can include logic that enforces one or more rules, and/or the like with respect to the construction, operation, functioning, and/or the like of the data stream responsive to, based at least in part on, and/or the like detecting, determining, and/or the like such change(s) in the mode, state, context, and/or the like of autonomous vehicle 20.

At (326), autonomous vehicle 20 can communicate the data indicating the multiple different and distinct types of information (e.g., via the modified data stream, and/or the like) to computing system 80, which can receive the data.

In some embodiments, the multiple different and distinct types of information can be communicated by autonomous vehicle 20 to computing system 80 (e.g., via the data stream, and/or the like) at various rates (e.g., frequencies, hertz, and/or the like). In some of such embodiments, modifying the parameter(s) can include changing one or more of such rate(s).

Additionally or alternatively, modifying the parameter(s) can include changing the types of information included amongst the different and distinct types of information communicated. For example, the parameter(s) could be modified to change whether or not the different and distinct types of information (e.g., the data stream, and/or the like) include data indicating whether autonomous vehicle 20 is engaged in commissioned travel, a type of commissioned travel with which autonomous vehicle 20 is engaged, a pickup location associated with commissioned travel with which autonomous vehicle 20 is engaged, a drop-off location associated with commissioned travel with which autonomous vehicle 20 is engaged, passenger information associated with commissioned travel with which autonomous vehicle 20 is engaged, a version of software being executed by autonomous vehicle 20, diagnostic information associated with autonomous vehicle 20, a speed of autonomous vehicle 20, a location of autonomous vehicle 20, a route which autonomous vehicle 20 is following, and/or the like.

At (328), autonomous vehicle 20 can receive data (e.g., configuration information, instructions, and/or the like) indicating one or more portions of the different and distinct types of information (e.g., associated with a requested configuration change, and/or the like) from computing device 40 (e.g., a remotely located computing device associated with a technician, diagnostic system, remote-assistance system, and/or the like). For example, autonomous vehicle 20 can receive data from computing device 40 indicating that information pertinent to providing remote assistance (e.g., a live video stream, and/or the like) should be included, that information less pertinent to providing the remote assistance (e.g., one or more unrelated diagnostic logs, and/or the like) should not be communicated or should be communicated with less frequency, and/or the like. In some embodiments, such communication can be via an API provided by autonomous vehicle 20 (e.g., via the SDK, and/or the like), computing device 40, and/or the like (e.g., such an API can serve to effectuate a central configuration service used to provide dynamic configuration changes to autonomous vehicle 20, and/or the like).

In some of such embodiments, autonomous vehicle 20 can modify the parameter(s) based at least in part on such received data. For example, at (330), autonomous vehicle 20 can determine, detect, identify, and/or the like one or more changes in a mode, state, context, and/or the like of autonomous vehicle 20 (e.g., based at least in part on the data received at (328), and/or the like), and, at (332), responsive to detecting the change(s), autonomous vehicle 20 can modify one or more parameters of a data stream transmitted from autonomous vehicle 20 (e.g., associated with the communication at (320), (326), and/or the like).

At (334), autonomous vehicle 20 can communicate the data indicating the multiple different and distinct types of information (e.g., via the modified data stream, and/or the like) to computing system 80, which can receive the data.

Referring to FIG. 3C, at (336), autonomous vehicle 30 can communicate data indicating multiple different and distinct types of information (e.g., telemetry, travel data, diagnostic information, and/or the like) to computing system 70, which can receive the data and, at (338), can communicate such data to computing system 80, which can receive the data. For example, autonomous vehicle 30 can be associated with an entity that is associated with computing system 70 and operates a plurality of associated autonomous vehicles (e.g., a fleet of autonomous vehicles, and/or the like) different and distinct from the plurality of autonomous vehicles that includes autonomous vehicle 10 and is associated with the different and distinct entity with which computing system 80 is associated, and autonomous vehicle 30 can be configured to communicate (e.g., directly via one or more wireless-communication interfaces, network(s) 106, and/or the like) a data stream comprising the data indicating the multiple different and distinct types of information to computing system 70, which can receive the data stream and communicate (e.g., relay, and/or the like) the data to computing system 80. In some embodiments, such communication can be via an API provided by autonomous vehicle 30, computing system(s) 70 and/or 80, and/or the like. In some embodiments, computing system 70 can be remotely located from autonomous vehicle 30 (e.g., a server, one or more computing devices physically located onboard a different vehicle, and/or the like).

At (340), autonomous vehicle 30 can determine, detect, identify, and/or the like one or more changes in a mode, state, context, and/or the like of autonomous vehicle 30. For example, over time the mode, state, context, and/or the like of autonomous vehicle 30 can change (e.g., specified travel can be completed, new travel can commence, one or more diagnostic routines can be initiated, and/or the like), and autonomous vehicle 30 can determine, detect, identify, and/or the like such changes. For example, autonomous vehicle 30 can determine, detect, identify, and/or the like whether autonomous vehicle 30 is in a test mode, whether autonomous vehicle 30 is in a diagnostic mode, whether autonomous vehicle 30 is in a remote-assistance mode, whether autonomous vehicle 30 is in an environment-mapping mode, whether autonomous vehicle 30 is engaged in commissioned travel, a type of commissioned travel with which autonomous vehicle 30 is engaged, and/or the like.

At (342), responsive to detecting the change(s), autonomous vehicle 30 can modify one or more parameters of a data stream transmitted from autonomous vehicle 30 that includes the multiple different and distinct types of information (e.g., associated with the communication at (336), and/or the like). For example, autonomous vehicle 30 can include logic that enforces one or more rules, and/or the like with respect to the construction, operation, functioning, and/or the like of the data stream responsive to, based at least in part on, and/or the like detecting, determining, and/or the like such change(s) in the mode, state, context, and/or the like of autonomous vehicle 30.

At (344), autonomous vehicle 30 can communicate the data indicating the multiple different and distinct types of information (e.g., via the modified data stream, and/or the like) to computing system 70, which can receive the data and, at (346), can communicate such data to computing system 80, which can receive the data.

In some embodiments, the multiple different and distinct types of information can be communicated by autonomous vehicle 30 to computing system 70 (e.g., via the data stream, and/or the like) at various rates (e.g., frequencies, hertz, and/or the like). In some of such embodiments, modifying the parameter(s) can include changing one or more of such rate(s).

Additionally or alternatively, modifying the parameter(s) can include changing the types of information included amongst the different and distinct types of information communicated. For example, the parameter(s) could be modified to change whether or not the different and distinct types of information (e.g., the data stream, and/or the like) include data indicating whether autonomous vehicle 30 is engaged in commissioned travel, a type of commissioned travel with which autonomous vehicle 30 is engaged, a pickup location associated with commissioned travel with which autonomous vehicle 30 is engaged, a drop-off location associated with commissioned travel with which autonomous vehicle 30 is engaged, passenger information associated with commissioned travel with which autonomous vehicle 30 is engaged, a version of software being executed by autonomous vehicle 30, diagnostic information associated with autonomous vehicle 30, a speed of autonomous vehicle 30, a location of autonomous vehicle 30, a route which autonomous vehicle 30 is following, and/or the like.

At (348), computing system 70 can receive data (e.g., configuration information, instructions, and/or the like) indicating one or more portions of the different and distinct types of information (e.g., associated with a requested configuration change, and/or the like) from computing device 40 (e.g., a remotely located computing device associated with a technician, diagnostic system, remote-assistance system, and/or the like), and, at (350), computing system 70 can communicate (e.g., relay, and/or the like) such data to autonomous vehicle 30, which can receive the data. For example, such data can indicate that information pertinent to providing remote assistance (e.g., a live video stream, and/or the like) should be included, that information less pertinent to providing the remote assistance (e.g., one or more unrelated diagnostic logs, and/or the like) should not be communicated or should be communicated with less frequency, and/or the like. In some embodiments, such communication can be via an API provided by autonomous vehicle 30, computing device 40, computing system(s) 70 and/or 80, and/or the like (e.g., such an API can serve to effectuate a central configuration service used to provide dynamic configuration changes to autonomous vehicle 30, and/or the like).

In some of such embodiments, autonomous vehicle 30 can modify the parameter(s) based at least in part on such received data. For example, at (352), autonomous vehicle 30 can determine, detect, identify, and/or the like one or more changes in a mode, state, context, and/or the like of autonomous vehicle 30 (e.g., based at least in part on the data received at (350), and/or the like), and, at (354), responsive to detecting the change(s), autonomous vehicle 30 can modify one or more parameters of a data stream transmitted from autonomous vehicle 30 (e.g., associated with the communication at (336), (344), and/or the like).

At (356), autonomous vehicle 30 can communicate the data indicating the multiple different and distinct types of information (e.g., via the modified data stream, and/or the like) to computing system 70, which can receive the data and, at (358), can communicate such data to computing system 80, which can receive the data.

Figure 5:
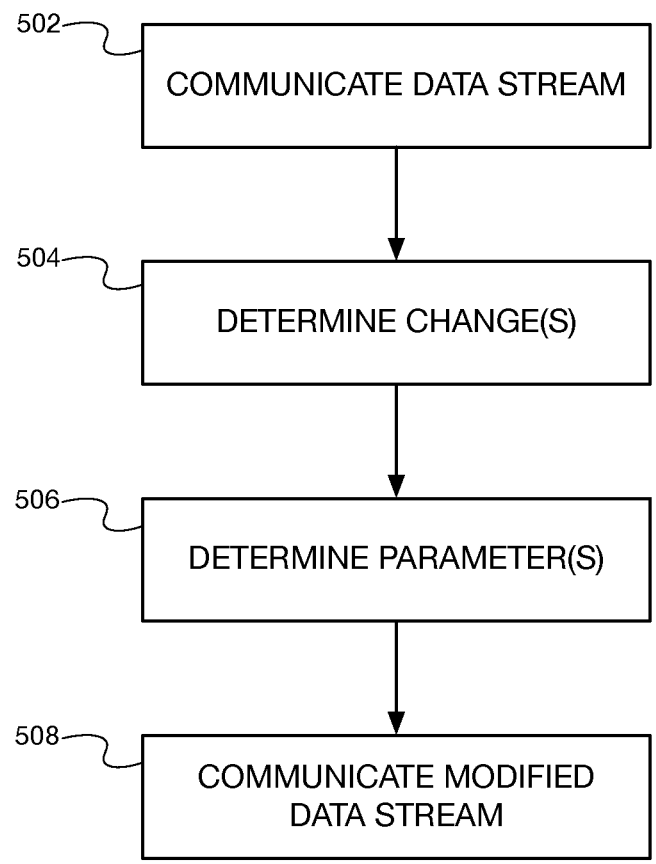
FIG. 5 depicts an example method according to example embodiments of the present disclosure.

FIG. 5 depicts an example method according to example embodiments of the present disclosure.

Referring to FIG. 5, at (502), a computing system comprising one or more computing devices physically located onboard a vehicle can communicate a plurality of different and distinct types of information associated with the vehicle to a remotely located computing system. For example, autonomous vehicle(s) 10 (e.g., computing system 102, and/or the like), 20, and/or 30 can communicate (e.g., via one or more data streams, and/or the like) different and distinct types of information associated with autonomous vehicle(s) 10, 20, and/or 30 to computing system(s) 70 and/or 80.

At (504), the computing system can determine one or more changes in at least one of a mode, state, or context of the vehicle. For example, autonomous vehicle(s) 10 (e.g., computing system 102, and/or the like), 20, and/or 30 can determine one or more changes in at least one of a mode, state, or context of autonomous vehicle(s) 10, 20, and/or 30.

At (506), the computing system can modify one or more parameters of a data stream transmitted from the vehicle and comprising the plurality of different and distinct types of information associated with the vehicle. For example, autonomous vehicle(s) 10 (e.g., computing system 102, and/or the like), 20, and/or 30 can modify one or more parameters of one or more data streams transmitted from autonomous vehicle(s) 10, 20, and/or 30 and comprising the plurality of different and distinct types of information associated with autonomous vehicle(s) 10, 20, and/or 30.

At (508), the computing system can communicate the modified data stream comprising the plurality of different and distinct types of information associated with the vehicle. For example, autonomous vehicle(s) 10 (e.g., computing system 102, and/or the like), 20, and/or 30 can communicate the data indicating the multiple different and distinct types of information (e.g., via the modified data stream(s), and/or the like) to computing system(s) 70 and/or 80.

Figure 6:
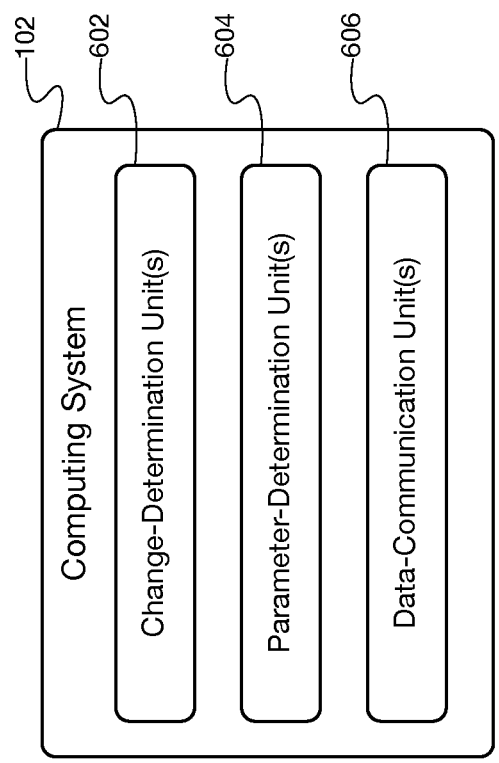
FIG. 6 depicts an example computing system according to example embodiments of the present disclosure.

FIG. 6 depicts an example computing system according to example embodiments of the present disclosure.

Referring to FIG. 6, various means can be configured to perform the methods and processes described herein. For example, computing system 102 can include change-determination unit(s) 602, parameter-determination unit(s) 604, data-communication unit(s) 606, and/or other means for performing the operations and functions described herein. In some implementations, one or more of the units can be implemented separately. In some implementations, one or more units can be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to communicate the plurality of different and distinct types of information, determine the change(s) in the at least one of the mode, state, or context of the vehicle, modify the parameter(s) of the data stream transmitted from the vehicle, and/or the like.

The technology discussed herein refers to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), and/or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), and/or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, and/or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:
communicating, by a computing system comprising one or more computing devices physically located onboard a vehicle, to a remotely located computing system, and via a data stream transmitted from the vehicle to the remotely located computing system, a plurality of different and distinct types of information associated with commissioned travel of a vehicle;
determining, by the computing system, one or more changes associated with the vehicle, the one or more changes indicative of one or more of whether the vehicle is engaged in the commissioned travel or a type of the commissioned travel with which the vehicle is engaged;
responsive to determining the one or more changes, modifying, by the computing system, one or more parameters of the data stream transmitted from the vehicle to the remotely located computing system; and
receiving, from the remotely located computing system, instructions for controlling the vehicle in response to receipt of the data stream transmitted from the vehicle to the remotely located computing system.

2. The computer-implemented method of claim 1, wherein modifying the one or more parameters comprises modifying one or more rates at which one or more of the plurality of different and distinct types of information are communicated to the remotely located computing system.

3. The computer-implemented method of claim 1, wherein modifying the one or more parameters comprises changing whether the data stream includes data indicating one or more of:
a pickup location associated with the commissioned travel with which the vehicle is engaged;
a drop-off location associated with commissioned travel with which the vehicle is engaged; or
passenger information associated with commissioned travel with which the vehicle is engaged.

4. The computer-implemented method of claim 1, wherein modifying the one or more parameters comprises changing whether the data stream includes data indicating one or more of:
a speed of the vehicle;
a location of the vehicle; or
a route which the vehicle is following.

5. The computer-implemented method of claim 1, wherein:
the method comprises receiving, by the computing system and from a remotely located computing device, data indicating one or more portions of the plurality of different and distinct types of information; and modifying the one or more parameters comprises modifying the one or more parameters based at least in part on the data indicating the one or more portions.

6. The computer-implemented method of claim 1, wherein:
the vehicle and the remotely located computing system are associated with a common entity that operates a plurality of vehicles including the vehicle; and
communicating the plurality of different and distinct types of information comprises communicating, via one or more networks, the data stream directly from the vehicle to the remotely located computing system.

7. The computer-implemented method of claim 1, wherein:
the vehicle is associated with an entity that operates a plurality of vehicles including the vehicle; and
the remotely located computing system is associated with a different and distinct entity that provides vehicle services.

8. The computer-implemented method of claim 7, wherein communicating the plurality of different and distinct types of information comprises communicating, via one or more networks, the data stream directly from the vehicle to the remotely located computing system.

9. The computer-implemented method of claim 7, wherein communicating the plurality of different and distinct types of information comprises communicating the plurality of different and distinct types of information via an application programming interface (API) provided by at least one of the computing system or the remotely located computing system.

10. The computer-implemented method of claim 7, wherein communicating the plurality of different and distinct types of information comprises:
communicating, via one or more networks, the data stream directly from the vehicle to a different and distinct remotely located computing system, the different and distinct remotely located computing system being associated with the entity that operates the plurality of vehicles including the vehicle; and
receiving, by the remotely located computing system and from the different and distinct remotely located computing system, the plurality of different and distinct types of information.

11. The computer-implemented method of claim 10, wherein communicating the plurality of different and distinct types of information comprises communicating the plurality of different and distinct types of information via an application programming interface (API) provided by at least one of the computing system, the remotely located computing system, or the different and distinct remotely located computing system.

12. The computer-implemented method of claim 1, wherein the vehicle comprises an autonomous vehicle.

13. The computer-implemented method of claim 1, wherein the remotely located computing system is physically located onboard a different vehicle.

14. A vehicle comprising:
one or more wireless-communication interfaces; and
one or more computing devices comprising one or more processors and a memory storing instructions that when executed by the one or more processors cause the one or more computing devices to perform operations comprising:

communicating, via the one or more wireless-communication interfaces, to a remotely located computing system, and at a first rate, a particular type of information associated with the vehicle; and
responsive to determining one or more changes associated with the vehicle, the one or more changes indicative of one or more of whether the vehicle is engaged in commissioned travel or a type of the commissioned travel with which the vehicle is engaged, communicating, via the one or more wireless-communication interfaces, to the remotely located computing system, and at a second rate, the particular type of information, the second rate being different from the first rate; and
receiving, from the remotely located computing system, instructions for controlling the vehicle in response to receipt of the particular type of information transmitted from the vehicle to the remotely located computing system.

15. The vehicle of claim 14, wherein the particular type of information comprises one or more of:
a pickup location associated with the commissioned travel with which the vehicle is engaged;
a drop-off location associated with commissioned travel with which the vehicle is engaged; or
passenger information associated with commissioned travel with which the vehicle is engaged.

16. The vehicle of claim 14, wherein the particular type of information comprises one or more of:
a speed of the vehicle;
a location of the vehicle; or
a route which the vehicle is following.

17. The vehicle of claim 14, wherein the operations comprise:
receiving, from a remotely located computing device, data indicating the second rate; and
responsive to receiving the data indicating the second rate, communicating the particular type of information at the second rate.

18. One or more non-transitory computer-readable media comprising instructions that when executed by one or more computing devices physically located onboard a vehicle cause the one or more computing devices to perform operations comprising:
communicating, to a remotely located computing system, and via a data stream transmitted from the vehicle to the remotely located computing system, a plurality of different and distinct types of information associated with commissioned travel of a vehicle;
determining one or more changes associated with the vehicle, the one or more changes indicative of one or more of whether the vehicle is engaged in the commissioned travel or a type of the commissioned travel with which the vehicle is engaged;
responsive to determining the one or more changes, modifying one or more of a rate of data communication or a particular type of information associated with the data stream transmitted from the vehicle to the remotely located computing system; and
receiving, from the remotely located computing system, instructions for controlling the vehicle in response to receipt of the data stream transmitted from the vehicle to the remotely located computing system.

19. The one or more non-transitory computer-readable media of claim 18, wherein the operations comprise receiving, from a remotely located computing device, data indicating the one or more changes to the at least one of:

the plurality of different and distinct types of information to be communicated to the remotely located computing system; or the one or more rates at which the one or more of the plurality of different and distinct types of information are to be communicated to the remotely located computing system.

20. The one or more non-transitory computer-readable media of claim 18, wherein the particular type of information associated with the data stream comprises one or more of:

a pickup location associated with the commissioned travel with which the vehicle is engaged;

a drop-off location associated with commissioned travel with which the vehicle is engaged; or passenger information associated with commissioned travel with which the vehicle is engaged.

\* \* \* \* \*